US008264843B2

(12) United States Patent
Lee et al.

(10) Patent No.: US 8,264,843 B2
(45) Date of Patent: Sep. 11, 2012

(54) MOBILE COMMUNICATION DEVICE AND CARD SOCKET THEREOF

(75) Inventors: Shen-Yuan Lee, Taipei (TW); Chien-Ming Hung, Taipei (TW)

(73) Assignee: Asustek Computer Inc., Taipei (TW)

( * ) Notice: Subject to any disclaimer, the term of this patent is extended or adjusted under 35 U.S.C. 154(b) by 430 days.

(21) Appl. No.: 12/507,707

(22) Filed: Jul. 22, 2009

(65) Prior Publication Data
US 2010/0053913 A1   Mar. 4, 2010

(30) Foreign Application Priority Data
Aug. 27, 2008   (TW) .............................. 97132694 A

(51) Int. Cl.
*H05K 1/14*   (2006.01)
(52) U.S. Cl. ...................................................... 361/737
(58) Field of Classification Search .................. 361/731, 361/686, 727, 737, 752, 748; 439/945, 946
See application file for complete search history.

(56) References Cited

U.S. PATENT DOCUMENTS

| | | | | |
|---|---|---|---|---|
| 5,650,916 A * | 7/1997 | Osaki et al. | ..................... | 361/737 |
| 5,813,878 A * | 9/1998 | Kuwata et al. | ................. | 439/326 |
| 5,889,649 A * | 3/1999 | Nabetani et al. | ......... | 361/679.38 |
| 5,933,328 A * | 8/1999 | Wallace et al. | ................. | 361/737 |
| 5,946,194 A * | 8/1999 | Dudas et al. | ..................... | 361/737 |
| 6,018,461 A * | 1/2000 | Biermann et al. | ............. | 361/737 |
| 6,125,034 A * | 9/2000 | Bovio et al. | .............. | 361/679.32 |
| 6,413,108 B2 * | 7/2002 | Centofante | .................... | 439/267 |
| 6,468,101 B2 * | 10/2002 | Suzuki | ........................... | 439/326 |
| 6,509,876 B1 * | 1/2003 | Jones et al. | ..................... | 343/702 |
| 6,551,131 B1 * | 4/2003 | Kuo | ............................. | 439/541.5 |
| 6,623,304 B2 * | 9/2003 | Harasawa et al. | .............. | 439/630 |
| 6,768,644 B2 * | 7/2004 | Kakinoki et al. | .............. | 361/737 |
| 6,814,596 B2 * | 11/2004 | Yu et al. | ......................... | 439/159 |
| 6,951,472 B2 * | 10/2005 | Shih | ............................... | 439/326 |
| 6,966,786 B1 * | 11/2005 | Motojima et al. | ............ | 439/159 |
| 6,981,885 B2 * | 1/2006 | Oh | ................................. | 439/630 |
| 7,009,846 B1 * | 3/2006 | Wang et al. | ..................... | 361/737 |
| 7,161,811 B2 * | 1/2007 | Richter | ........................... | 361/737 |
| 7,165,997 B1 * | 1/2007 | Hou | .............................. | 439/630 |
| 7,355,860 B2 * | 4/2008 | Miller et al. | ................... | 361/737 |

(Continued)

FOREIGN PATENT DOCUMENTS
CN         2735666 Y         10/2005
(Continued)

*Primary Examiner* — Lisa Lea Edmonds
*Assistant Examiner* — Xanthia C Cunningham
(74) *Attorney, Agent, or Firm* — Morris Manning & Martin LLP; Tim Tingkang Xia, Esq.

(57) ABSTRACT

The invention discloses a card socket comprising a base, a first resilient member, a holder, a second resilient member and a driving rod. The base comprises a bottom surface and a side wall with a block portion. The first resilient member is disposed on the bottom surface. The holder is pivotally connected to the base and compresses the first resilient member. The holder comprises an accommodating space, and a card member is removably accommodated in the accommodating space. The second resilient member and the driving rod are also disposed in the accommodating space. The driving rod comprises a hook and a recess. The hook is against the second resilient member and is capable of driving the card member to move. The block portion restrains the driving rod on the base. Furthermore, the restriction between the driving rod and the block portion can be removed through the recess.

9 Claims, 6 Drawing Sheets

U.S. PATENT DOCUMENTS

| | | | |
|---|---|---|---|
| 7,361,056 B1 * | 4/2008 | Liu | 439/630 |
| 7,374,442 B2 * | 5/2008 | Anzai et al. | 439/188 |
| 7,417,866 B1 * | 8/2008 | Beseth et al. | 361/732 |
| 7,438,599 B2 * | 10/2008 | Uchida et al. | 439/630 |
| 7,632,140 B2 * | 12/2009 | Ting | 439/541.5 |

FOREIGN PATENT DOCUMENTS

| | | |
|---|---|---|
| CN | 2798357 Y | 7/2006 |
| CN | 200947473 Y | 9/2007 |

\* cited by examiner

MOBILE COMMUNICATION DEVICE AND CARD SOCKET THEREOF

CROSS-REFERENCE TO RELATED APPLICATIONS

This non-provisional application claims priority under 35 U.S.C. §119(a) on Patent Application No. 097132694 filed in Taiwan, R.O.C. on Aug. 27, 2008, the entire contents of which are hereby incorporated by reference.

BACKGROUND OF THE INVENTION

1. Field of the Invention

This invention relates to a card socket, and more particularly to a mobile communication device and the card socket thereof.

2. Description of the Prior Art

SIM (Subscriber Identity Module) cards can be used to identify the users of mobile phones and record various kinds of personal information and data. Although a SIM card is short and thin, the chip therein can record a lot of data, not only hundreds of phone numbers and messages, but also the data required during the processing of GSM (Global System for Mobile Communications) and the data for protecting users' rights.

The SIM cards of some mobile phones sold in the market nowadays are designed to be disposed under or adjacent to the antenna because of limited space. If there is a component, such as an electromagnetic shielding device, located in front of a SIM card, a high-frame type card socket will be adopted for the SIM card to be installed, to let the SIM card eject from the card socket successfully. Wherein the height of the metal terminals of the high-frame type card sockets is about 3 to 4 mm and the height of the antenna is about 6 mm. Therefore, if the antenna is located over the card socket, the distance between the metal terminals and the antenna is only 2 to 3 mm. The result of adopting the high-frame type card socket will make the distance between the SIM card and antennas too short, which will affect the efficiency of the antenna.

SUMMARY OF THE INVENTION

A scope of the invention is to provide a card socket which can be disposed in a mobile communication device for accommodating a card member. More particularly, the card member can be taken out of the card socket successfully without adopting a high-frame type card socket.

According to an embodiment, the card socket of the invention includes a base, a first resilient member, a holder, a second resilient member, and a driving rod. The base includes a bottom surface and a side wall having a block portion. The first resilient member is disposed on the bottom surface. The holder is pivotally connected to the base and compresses the first resilient member. The holder includes an accommodating space, and a card member is adapted to be disposed in the accommodating space. The second resilient member and the driving rod are also disposed in the accommodating space, and the second resilient is adjacent to the location the holder is pivotally connected to the base. The driving rod includes a hook and a recess. The hook is adapted to be against the second resilient member and drives the card member to move. The block portion is adapted to restrain the driving rod on the base and to restrain the card member in the accommodating space. Furthermore, the restriction between the driving rod and the block portion can be removed through the recess.

In the embodiment, when the driving rod is operated to compress the second resilient member, the recess on the driving rod will move to the underside of the holder. At the same time, the block portion can pass through the recess to make the rod rotate relative to the base by the elastic force of the first resilient member, and the hook of the driving member can push the card member outwardly by the elastic force of the second resilient member. Thereby, users can easily take the card member out of the card socket.

The card socket of the invention includes two operation ways: "push-push" and "rotation". Only by pushing the driving rod toward the inner of the holder and then releasing, the users can successfully take out the card member inclinedly without being constrained by the inner space of the mobile communication device. The invention does not adopt a high-frame type card socket, thus the height of the metal terminals is less than 1 mm (e.g., the distance between the metal terminals and the antenna is about 5 mm). Accordingly, the space for the antenna can be increased, and the efficiency of the antenna can be much better relatively.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
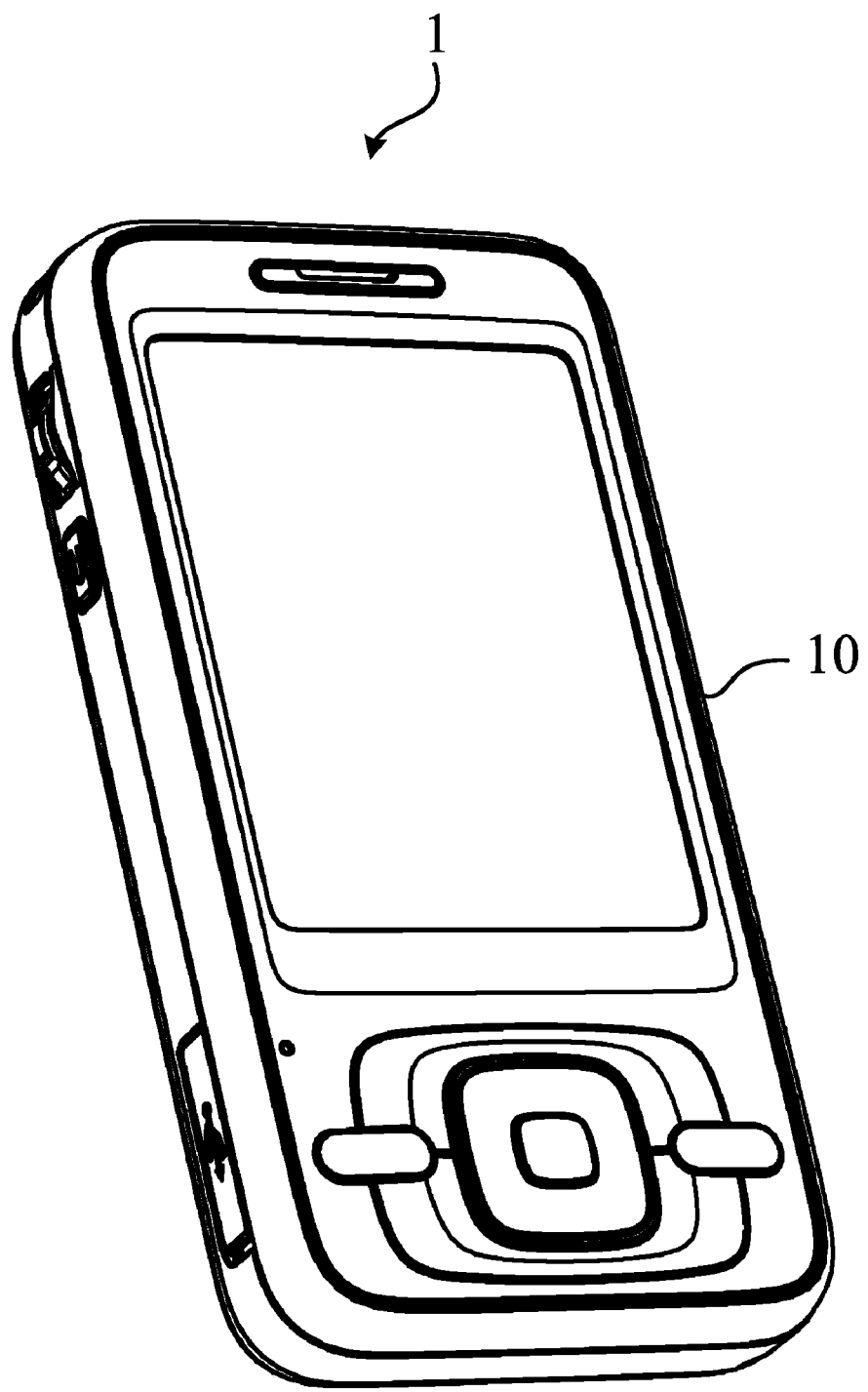
FIG. 1 is a schematic diagram illustrating a mobile communication device according to an embodiment of the invention.
Figure 2:
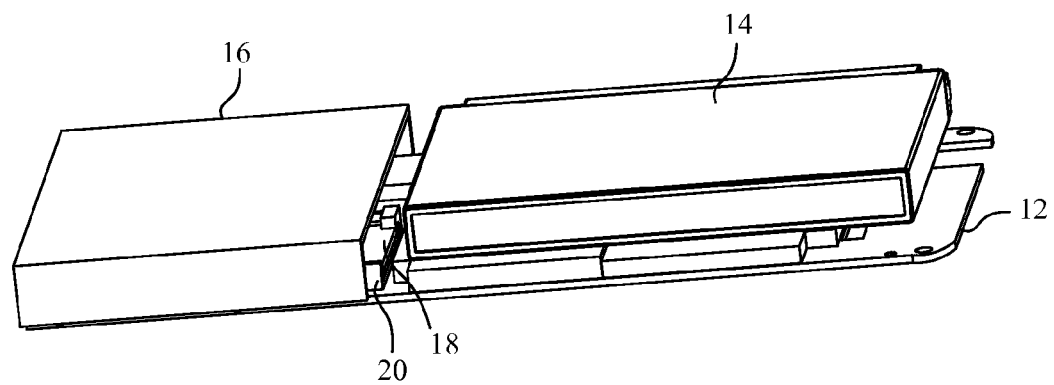
FIG. 2 is a schematic diagram illustrating the inner components of the mobile communication device in FIG. 1.
Figure 3:
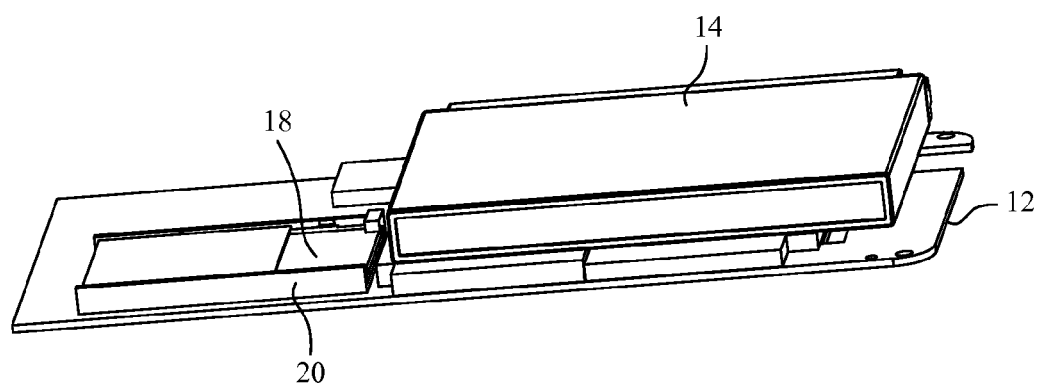
FIG. 3 is a schematic diagram illustrating the antenna cap in FIG. 2, wherein the antenna cap is removed.

Please refer from FIG. 1 to FIG. 3. FIG. 1 is a schematic diagram illustrating a mobile communication device 1 according to an embodiment of the invention. FIG. 2 is a schematic diagram illustrating the inner components of the mobile communication device 1 in FIG. 1. FIG. 3 is a schematic diagram illustrating the antenna cap 16 in FIG. 2, wherein the antenna cap 16 is removed.

The case 10 of the mobile communication device 1 as shown in FIG. 1 is installed with necessary software and hardware during operation, such as a CPU (Central Processing Unit), RAM (Random Access Memory), ROM (Read Only Memory), a display panel, a backlight module, an operating system, etc. The functions of the above-mentioned components can be easily achieved and applied by the people skilled in the art, so it will not be described in detail here.

As shown in FIG. 2 and FIG. 3, a circuit board 12, a battery 14, an antenna cap 16, and a card member 18 and a card socket 20 (e.g., the card member and the card socket of a SIM card) can be included in the case 10 of the mobile communication device 1 in FIG. 1. The circuit board 12, the battery 14, the antenna cap 16, the card member 18, and the card socket 20 are all disposed in the case 10 in FIG. 1. The battery 14 is removably disposed over the circuit board 12, to be electrically connected to the circuit board 12. The card socket 20 is also disposed on the circuit board 12, and the card member 18 is disposed in the card socket 20. In the embodiment, the antenna cap 16 is covered over the card socket 20, and the antenna (not shown) is disposed on the antenna cap 16.

Figure 4:
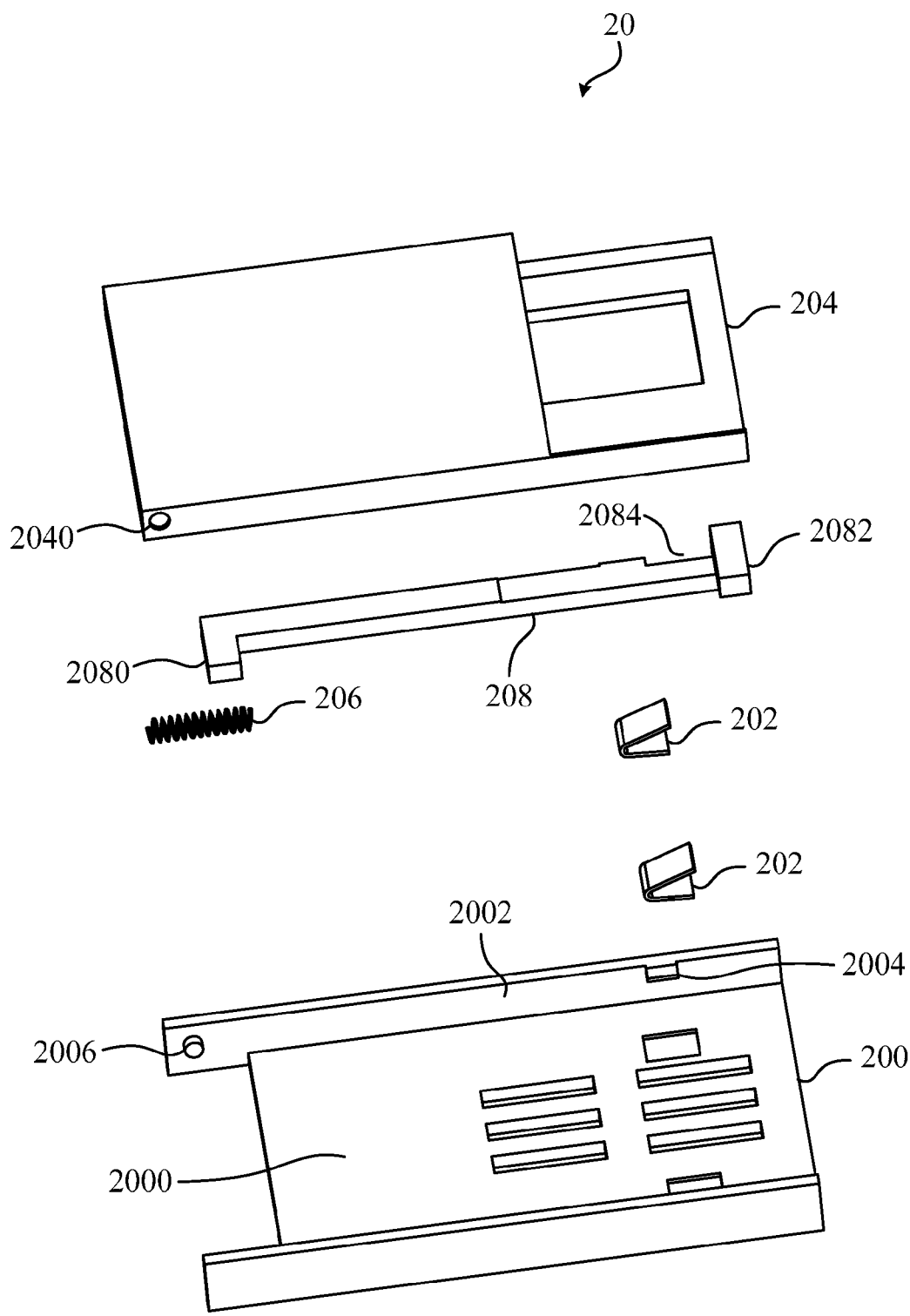
FIG. 4 is an exploded view illustrating the card socket in FIG. 3.

Please refer to FIG. 4. FIG. 4 is an exploded view illustrating the card socket 20 in FIG. 3. As shown in FIG. 4, the card socket 20 includes a base 200, two first resilient members 202, a holder 204, a second resilient member 206, and a stem 208. In the embodiment, the first resilient member 202 can be, but not limited to, a leaf spring, and the second resilient member 206 can be, but not limited to, a spring. The types of the first resilient member 202 and the second resilient member 206 can be determined according to practical applications. Besides, the number of the first resilient members 202 can be determined according to practical applications, rather than limiting to two.

The base 200 includes a bottom surface 2000 and a side wall 2002 connected to the bottom surface 2000. The base 200 is fixed on the circuit board 12. In the embodiment, the side wall 2002 has a block portion 2004. As shown in FIG. 4, the block portion 2004 is a block which is extended from the side wall 2002. The two first resilient members 202 are respectively disposed on the bottom surface 2000.

Figure 5:
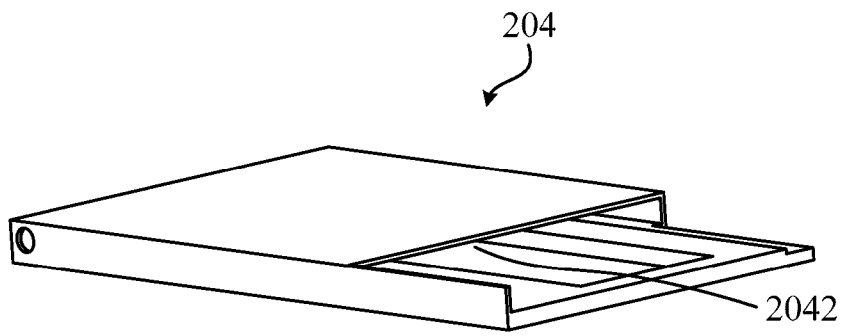
FIG. 5 is another view illustrating the holder in FIG. 4.

The holder 204 is pivotally connected to the pivotal shafts 2006 at two sides of the base 200 with the pivotal holes 2040 at two sides of the holder 204. Thereby, the holder 204 can rotate relative to the base 200. It is notable owing to the viewpoint only one pivotal hole 2040 and one pivotal shaft 2006 are shown in FIG. 4. The holder 204 is disposed and compresses on the first resilient member 202. The elastic force induced from the compressed first resilient member 202 will push the holder 204 upwardly without be effected by other external forces. Additionally, please refer to FIG. 5 which is another view illustrating the holder 204 in FIG. 4. As shown in FIG. 5, the holder 204 includes an accommodating space 2042. The card member 18 in FIG. 3 is adapted to be disposed in the accommodating space 2042 of the holder 204.

Moreover, the second resilient member 206 and the driving rod 208 are also disposed in the accommodating space 2024 of the holder 204. The second resilient member 206 is adjacent to the location where the holder 204 is pivotally connected to the base, and the driving rod 208 is adjacent to the side wall 2002. The driving rod 208 includes a hook 2080, a holding portion 2082, and a recess 2084.

Figure 6:
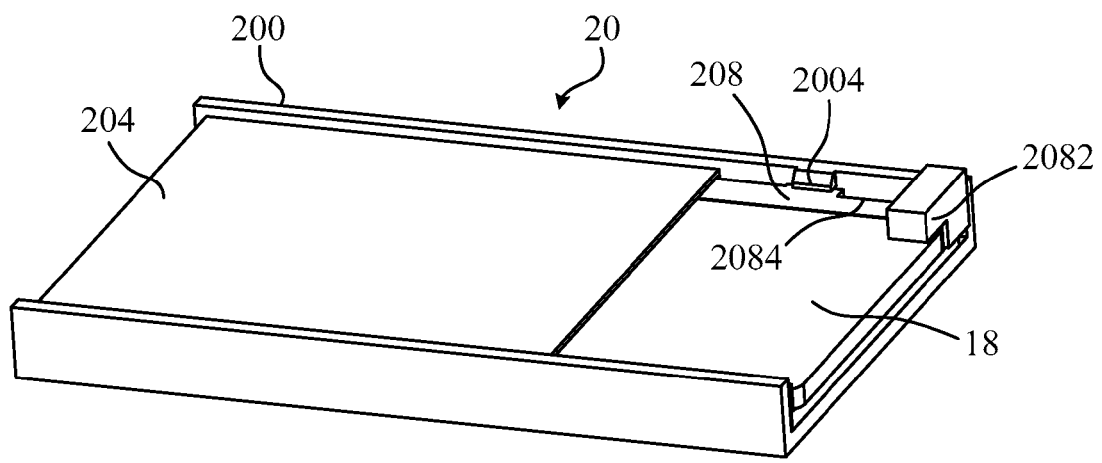
FIG. 6 is a schematic diagram illustrating that the card member is disposed in the card socket.
Figure 7:
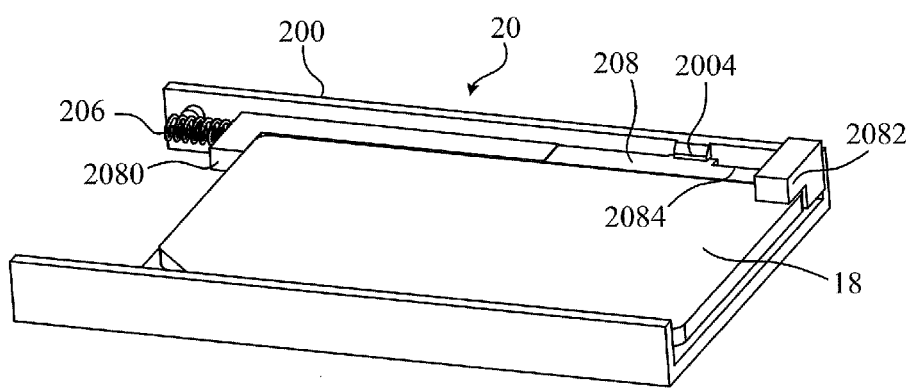
FIG. 7 is a schematic diagram illustrating the card socket in FIG. 6, wherein the holder of the card socket has been removed.

Please refer form FIG. 6 to FIG. 7. FIG. 6 is a schematic diagram illustrating that the card member 18 is disposed in the card socket 20. FIG. 7 is a schematic diagram illustrating the card socket 20 in FIG. 6, wherein the holder 204 of the card socket 20 has been removed. When the driving rod 208 and the card member 18 are disposed in the accommodating space 2042 of the holder 204 and fixed in the base 200 at the same time, the holder 204 will compress the first resilient member 202 which is disposed on the bottom surface 2000. Wherein, the first resilient member 202 will apply an upwardly force to the holder 204, and the card member 18 will be firmly fixed in the accommodating space 2042 of the holder 204 with the driving rod 208. To be more detailed, the driving rod 208 will be restricted by the block portion 2004 of the base 200 to constrain the card member 18 in the accommodating space 2042 of the holder 204, so as to prevent the holder 204 from being pushed upwardly by the elastic force induced from the compressed first resilient member 202. Besides, the holding portion 2082 of the driving rod 208 is used to fix the card member 18, as shown in FIG. 6. And, the hook 2080 of the driving rod 208 is connected with the second resilient member 206 and hooks the card member 18, as shown in FIG. 7.

Figure 8:
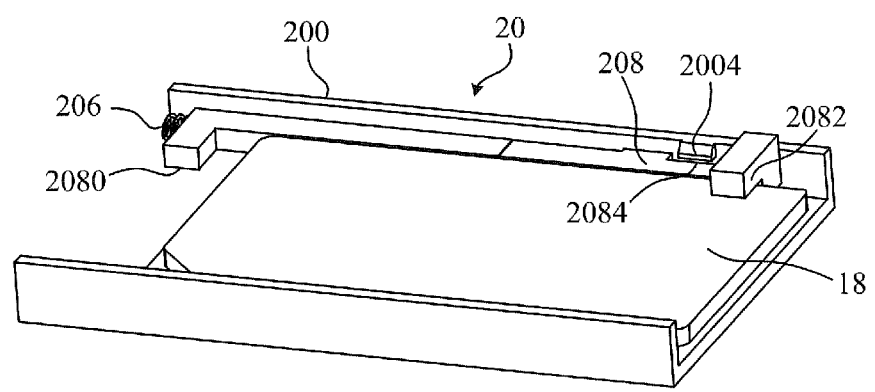
FIG. 8 is a schematic diagram illustrating the driving rod and the second resilient member in FIG. 7, wherein the driving rod compresses the second resilient member.
Figure 9:
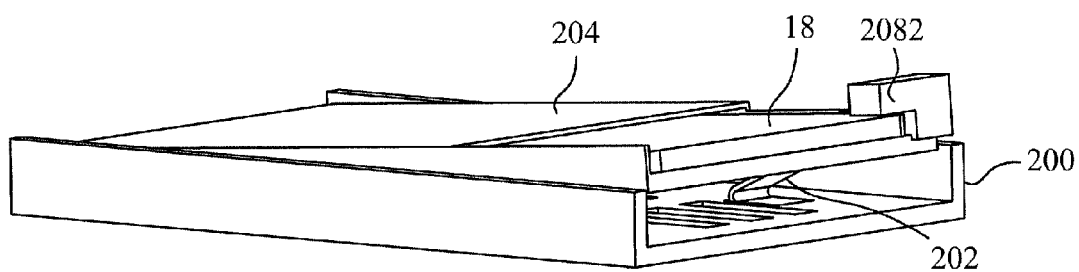
FIG. 9 is a schematic diagram illustrating the driving rod in FIG. 8, wherein the driving rod is pushed upwardly.
Figure 10:
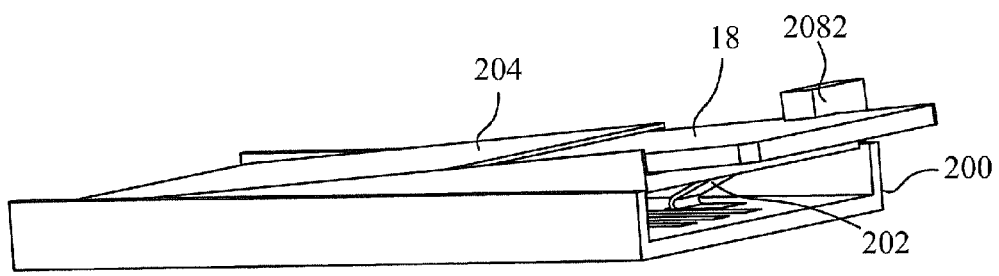
FIG. 10 is a schematic diagram illustrating the card member in FIG. 9, wherein the card member is pushed outwardly.

Please refer from FIG. 8 to FIG. 10. FIG. 8 is a schematic diagram illustrating the driving rod 208 and the second resilient member 206 in FIG. 7, wherein the driving rod 208 compresses the second resilient member 206. FIG. 9 is a schematic diagram illustrating the driving rod 208 in FIG. 8, wherein the driving rod 208 is pushed upwardly. FIG. 10 is a schematic diagram illustrating the card member 18 in FIG. 9, wherein the card member 18 is pushed outwardly. While willing to take the card member 18 out, a user can push the second resilient member 206 by the driving rod 208 and make the hook 2080 depart from the card member 18 temporarily, as shown in FIG. 8. At the same time, the recess 2084 will move to the underside of the block portion 2004 while pushing the driving rod 208, and the driving rod 208 can release the interference between the base 200 and the driving rod 208 with the recess 2084. Because the driving rod 208 is no longer interferes with the base 200, the card member 18 and the holder 204 will be pushed upwardly by the elastic force of the first resilient member 202 to rotate relative to the base 200, as shown in FIG. 9. Afterwards, the compressed second resilient member 206 will release the compression processing without be effected by other external forces, to generate an elastic force to push the driving rod 208 outwardly. The hook 2080 of the driving rod 208 can push the card member 18 outwardly by the elastic force of the second resilient member 206, as shown in FIG. 10. Thereby, the user can easily take the card member 18 out of the card socket 20.

It is notable that the height to which the holder 204 can be pushed can be adjusted by the first resilient member 202. In different mobile communication devices, the inclined angle to which the holder 204 is pushed upwardly can be adjusted according to different inner spaces, so that the card member 18 can be easily taken out by the user.

Compared with the prior art, the card socket of the invention includes two operation ways: "push-push" and "rotation". Only by pushing the driving rod toward the inner of the holder and then releasing, the users can successfully take out the card member inclinedly without being constrained by the inner space of the mobile communication device. The invention does not adopt a high-frame type card socket, thus the distance between the metal terminals and the antenna is constant. Accordingly, the space for the antenna can be increased, and the efficiency of the antenna can be much better relatively.

With the example and explanations above, the features and spirits of the invention will be hopefully well described. Those skilled in the art will readily observe that numerous modifications and alterations of the device may be made while retaining the features and spirit of the invention. Accordingly, the above disclosure should be construed as limited only by the metes and bounds of the appended claims

What is claimed is:

1. A card socket for accommodating a card member, the card socket comprising:
   a base comprising a bottom surface and a side wall connected to the bottom surface, the side wall having a block portion;
   a first resilient member being disposed on the bottom surface;

a holder comprising an accommodating space and being pivotally connected to the base and compressing the first resilient member, the card member being adapted to be disposed in the accommodating space;

a second resilient member being disposed in the accommodating space and adjacent to the location at where the holder is pivotally connected to the base; and a driving rod comprising a hook and a recess and being disposed in the accommodating space and adjacent to the side wall, the hook being adapted to be against the second resilient member and driving the card member to move, the block portion being adapted to restrain the driving rod on the base and to restrain the card member in the accommodating space, and the restriction between the driving rod and the block portion being removed through the recess, wherein the driving rod further comprises a holding portion for holding the card member.

2. The card socket of claim 1, wherein the first resilient member is a leaf spring.

3. The card socket of claim 1, wherein the second resilient member is a spring.

4. The card socket of claim 1, wherein the card member is a SIM (Subscriber Identity Module) card.

5. A mobile communication device comprising:
a case;
a circuit board being disposed in the case; and
a card socket, disposed in the case, the card socket comprising:
a base, fixed on the circuit board, the base comprising a bottom surface and a side wall connected to the bottom surface, the side wall having a block portion;
a first resilient member being disposed on the bottom surface;
a holder comprising an accommodating space and being pivotally connected to the base and compressing the first resilient member, a card member being adapted to be disposed in the accommodating space;
a second resilient member being disposed in the accommodating space and adjacent to the location at where the holder is pivotally connected to the base; and
a driving rod comprising a hook and a recess and being disposed in the accommodating space and adjacent to the side wall, the hook being adapted to be against the second resilient member and driving the card member to move, the block portion being adapted to restrain the driving rod on the base and to restrain the card member in the accommodating space, and the restriction between the driving rod and the block portion being removed through the recess.

6. The mobile communication device of claim 5, wherein the driving rod further comprises a holding portion for holding the card member.

7. The mobile communication device of claim 5, wherein the first resilient member is a leaf spring.

8. The mobile communication device of claim 5, wherein the second resilient member is a spring.

9. The mobile communication device of claim 5, wherein the card member is a SIM card.

\* \* \* \* \*